United States Patent
Segawa et al.

(10) Patent No.: US 6,765,961 B2
(45) Date of Patent: Jul. 20, 2004

(54) ENCODING DEVICE MOUNTED ON ONE CHIP FOR MULTIPLEXING VIDEO SIGNAL AND AUDIO SIGNAL

(75) Inventors: Hiroshi Segawa, Hyogo (JP); Satoshi Kumaki, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 657 days.

(21) Appl. No.: 09/814,092

(22) Filed: Mar. 22, 2001

(65) Prior Publication Data

US 2001/0031008 A1 Oct. 18, 2001

(30) Foreign Application Priority Data

Apr. 17, 2000 (JP) ........................................ 2001-115573

(51) Int. Cl.[7] .............................. H04N 7/12; H04J 3/04; G09G 5/00
(52) U.S. Cl. ........................... 375/240.01; 375/240.16; 370/536; 370/537; 345/3.1
(58) Field of Search .............................. 375/240, 240.1, 375/240.12, 390.16, 536, 537; 345/3.1

(56) References Cited

U.S. PATENT DOCUMENTS

| | | | | |
|---|---|---|---|---|
| 5,488,385 | A | * 1/1996 | Singhal et al. | 345/3.1 |
| 6,449,311 | B1 | * 9/2002 | Ozcelik et al. | 375/240.16 |
| 6,466,592 | B1 | * 10/2002 | Chapman | 370/537 |
| 6,466,619 | B1 | * 10/2002 | Sugahara | 375/240.01 |
| 6,477,185 | B1 | * 11/2002 | Komi et al. | 370/536 |

FOREIGN PATENT DOCUMENTS

JP   11-177436   7/1999
JP   11-225333   8/1999

OTHER PUBLICATIONS

"A Chip Set for Programmable Real–Time MPEG2 MP@ML Video Encoder", by Matsumura et al., IEICE Trans. Electron., vol. E81–C, No. 5 (May 1998), pp. 680–693.

"A Single–Chip MPEG2 422@ML Video, Audio, and System Encoder with a 162–MHz Media–Processor and Dual Motion Estimation Cores", by Kumaki et al., IEEE 1999 Custom Integrated Circuits Conference, pp. 94–99.

* cited by examiner

Primary Examiner—Chris Kelly
Assistant Examiner—Allen Wong
(74) Attorney, Agent, or Firm—McDermott Will & Emery LLP

(57) ABSTRACT

An encoding device includes a processor unit controlling an overall operation and at the same time having a software for executing an audio encoding process, a video encoding unit to execute a video encoding process, a multiplex process unit to execute a system process and a timing control unit to generate a timing signal for activating an audio encoding process, a video encoding process and a system process, all of these elements are mountable on the same substrate. Each of a control process for controlling the audio encoding process, the video encoding process and system process is executed as an interrupt process. The processor unit includes an interrupt control circuit. The interrupt control circuit selects, based on a predetermined priority, one interrupt process corresponding to at least one generated timing signal.

15 Claims, 13 Drawing Sheets

ENCODING DEVICE MOUNTED ON ONE CHIP FOR MULTIPLEXING VIDEO SIGNAL AND AUDIO SIGNAL

BACKGROUND OF THE INVENTION

1. Field of the Invention

The present invention relates to encoding devices, and more particularly to encoding devices allowing multiplexing of a video signal and an audio signal according to a predetermined compression encoding standard.

2. Description of the Background Art

Recently, MPEG2 (Moving Picture Experts Group) has become widely adopted as an international standard of data compression encoding in various applications including digital satellite broadcasting and DVD (Digital Versatile Disc). MPEG2 standard, defined in three layers, that is, video, audio and system layers, allows multiplexing of a video signal and an audio signal.

In general, according to MPEG2 standard, audio data compression and a process relating to a system do not require an excessively enormous and complicated operation, whereas an operation for video data compression is complicated and the amount of operation is enormous.

In a multiplexing of an audio signal and a video signal according to the conventional MPEG2 standard, generally the process relating to the audio and the system is realized through a software process in a processor unit, whereas the process relating to video is realized through a dedicated hardware, which is controlled through a software process in the processor unit.

Encoding devices performing such multiplexing are, therefore, implemented as multiplexing encoding systems formed as a combination of three devices, that is, an audio compression encoding device and a system multiplexing device both realized with a DSP (Digital Signal Processor), for example, in a software-like manner, and a video compression encoding device including an LSI (Large Scale Integrated Circuit) dedicated for image compression and a processor unit controlling the LSI.

With reference to FIG. 12, a multiplexing encoding system 300 of the conventional art includes a video compression encoding device 400 performing a video encoding process on a video signal, an audio compression encoding device 500 performing an audio encoding process on an audio signal and a system multiplexing device 600 performing a system process for multiplexing encoded video data and encoded audio data.

Video compression encoding device 400 performs a compression encoding of original video data supplied to a video input terminal 402 to generate encoded video data. Audio compression encoding device 500 performs a compression encoding of original audio data supplied to an audio input terminal 502 to generate encoded audio data.

System multiplexing device 600 receives encoded video data and encoded audio data from video compression encoding device 400 and audio compression encoding device 500, respectively, performs a multiplexing process according to a format defined by a system layer of MPEG2 standard, for example, generates and outputs resulting compressed data via an output terminal 606. The compression encoding process will also be referred to as an encoding process hereinbelow.

With reference to FIG. 13, video compression encoding device 400 includes a video encoding unit 420 encoding original video data supplied to video input terminal 402, a processor unit 410 controlling the encoding process at video encoding unit 420, an FIFO (First In First Out) buffer 455 receiving encoded video data generated in video encoding unit 420, a video timing generation unit 430 generating a timing signal for controlling a timing of execution of the video encoding process and an internal bus 450. The encoded video data supplied to FIFO buffer 455 is output via a video output terminal 406. Processor unit 410 is connected to video encoding unit 420 via internal bus 450. As video encoding unit 420, an image compression LSI, which is a dedicated hardware, is employed, for example.

Video encoding unit 420 includes a register 422 to hold a control parameter employed in the video encoding process. The control parameter held by register 422 is set through processor unit 410 via internal bus 450. The timing signals generated from video timing generation unit 430 include a picture timing signal PSYNC indicating an activation timing of a picture-related process and a macro block timing signal MBSYNC indicating an activation timing of a macro block-related process (hereinafter referred to also as MB process) in MPEG2 standard, for example.

FIG. 14 shows a timing chart referenced for describing an execution timing of the video encoding process.

With reference to FIG. 14, the picture-related process is executed in response to the generation of picture timing signal PSYNC and the MB process is executed in response to the generation of macro block timing signal MBSYNC.

In the video compression encoding, the number of frames n (n is a natural number) included in a second is determined and a cycle of the generation of picture timing signal PSYNC is 1/n second. For example, when thirty frames are included in a second, the cycle of picture timing signal PSYNC is 1/30 second.

In MPEG2 standard, the video compression encoding is executed with a one-frame image divided into macro blocks (hereinafter referred to simply as MB) serving as a unit of processing, of sixteen pixels×sixteen lines. If an image of one frame is formed from 720 pixels in a vertical direction× 480 lines in a horizontal direction, one frame includes 1350 MB's. Then, video timing generation unit 430 generates 1350 macro block timing signals MBSYNC during one cycle of picture timing signal PSYNC.

Video encoding section 420 operates in response to timing signals PSYNC and MBSYNC. In particular, video encoding unit 420 executes the MB process for each MB in response to macro block timing signal MBSYNC and executes the picture-related process which is common to all MB included in one frame in response to picture timing signal PSYNC.

A necessary control parameter for the picture-related process and the macro block-related process is set in register 422 through processor unit 410. Processor unit 410, hence, must operate in synchronization with timing signals PSYNC and MBSYNC.

When these timing signals PSYNC and MBSYNC generated from video timing generation unit 430 are supplied to an interrupt terminal of processor unit 410, processor unit 410 can execute an operation corresponding to the picture-related process and the macro block-related process as an interrupt process in synchronization with video encoding unit 420.

With reference to FIG. 15, audio compression encoding device 500 includes an FIFO buffer 532 receiving original audio data supplied to audio input terminal 502, a processor unit 510 including a software for executing an encoding process on the original audio data, an FIFO buffer 534 receiving encoded audio data supplied from processor unit 510, an audio output terminal 505 supplying the encoded audio data supplied from FIFO buffer 534, and an internal bus 550. Processor unit 510 is connected to FIFO buffers 532 and 534 via internal bus 550.

The original audio data supplied to audio input terminal 502 is then supplied to FIFO buffer 532. Processor unit 510 reads the original audio data from FIFO buffer 532 via internal bus 550. Processor unit 510 encodes the read original audio data according to an internally stored program to generate encoded audio data. The encoded audio data is written into FIFO buffer 534 via internal bus 550.

The encoded audio data supplied to FIFO buffer 534 is output from audio output terminal 505. The activation of the program for executing the audio encoding process in processor unit 510 is controlled through an audio timing generation unit 520.

With reference to FIG. 16, the audio encoding process in processor unit 510 is activated in response to generation of a timing signal FSYNC. When a sampling frequency of 48 kHz according to a layer II of the MPEG1 audio standard is employed as a mode for the audio encoding process, a frame defined by 1152 samples will be processed as one unit.

A length of one frame, then, becomes 1152 samples/48 kHz=0.024 sec and the processing of one frame must be completed every 24 msec to allow a smooth audio encoding. For the smooth operation, audio timing generation unit 520 generates timing signal FSYNC at a cycle of 24 msec and supplies the signal to the interrupt terminal of processor unit 510.

In response to an interrupt request through audio timing signal FSYNC, processor unit 510 activates a software for performing the audio compression encoding and executes the audio encoding process for each frame.

With reference to FIG. 17, system multiplexing device 600 includes an encoded video data input terminal 602 receiving an input of encoded video data, an FIFO buffer 652 provided corresponding to the encoded video data, an encoded audio data input terminal 604 receiving encoded audio data, an FIFO buffer 654 provided corresponding to the encoded audio data, a processor unit 610 controlling the multiplexing process, a header memory 640 holding header data of multiplexed compressed data stream and an internal bus 650.

System multiplexing device 600 further includes a multiplexing control unit 620 receiving header data output from header memory 640, encoded video data supplied from FIFO buffer 652 and encoded audio data from FIFO buffer 654, and selectively transferring one type of data to FIFO buffer 656, a compressed data output terminal 606 supplying the compressed data stream supplied from FIFO buffer 656, and a status generation unit 630 generating a timing signal BSOREQ for requesting a supply of new compressed data according to data amount in FIFO buffer 656.

Processor unit 610 generates and supplies header data to header memory 640 via internal bus 650. In addition, processor unit 610 sets via internal bus 650 a control parameter in a register 625, which parameter is provided in multiplexing control unit 620, for designating a selective transfer of data in multiplexing control unit 620.

When a format of a transport stream (hereinafter also referred to simply as TS) is adopted according to the MPEG2 system layer standard, for example, data is sequentially transferred to an FIFO buffer 656 in the order of 4-byte header data, 184-byte compressed (encoded) video data, 4-byte header data, and 184-byte compressed (encoded) audio data, thus encoded video data and encoded audio data are multiplexed and compressed data thereof can be generated.

In this case, which type of encoded data is to be transferred by how much data amount in what order, and so on, can be controlled through the setting of control parameters held in register 625 through processor unit 610.

In a system generally supplying TS data as compressed data, in most cases compressed data output terminal 606 is connected to a transmission line. In this case, compressed data must be output at a constant rate. The amount of data held in FIFO buffer 656 is, therefore, monitored through status generation unit 630, which generates and supplies timing signal BSOREQ to the interrupt terminal of processor unit 610 when the empty area of FIFO buffer 656 becomes larger than 188 bytes which corresponds to a constituent unit of the TS data, for example. In response, processor unit 610 indicates to multiplexing control unit 620 to transfer new multiplexed compressed data to FIFO buffer 656.

An encoding system allowing the multiplexing of the audio signal and the video signal can be thus provided, with the video compression device employing the image compression LSI which is a dedicated hardware device, the audio compression encoding device and the system multiplexing device both executing a software process corresponding to a program stored in the processor unit.

Because of the advancement in LSI integration in recent years, however, the integration of the video compression encoding device, the audio encoding device and the system multiplexing device on one LSI chip has become possible.

On the other hand, the video encoding process, the audio encoding process and the system process must be executed independent from each other at a predetermined cycle as described above. Hence, if these devices are arranged on the same LSI in the encoding device and share the same resources for plurality of processes, the control of the order of process execution becomes important when activation requests for the plurality of processes are made such that their execution overlap.

SUMMARY OF THE INVENTION

An object of the present invention is to provide an encoding device mountable on one LSI chip, for multiplexing a video signal and an audio signal while effectively sharing resources for different processes.

In brief, the present invention is an encoding device multiplexing an input video signal and an input audio signal according to a predetermined compression encoding standard, which encoding device includes: a processor unit, a timing control unit, a first buffer, a video encoding process unit, a second buffer, a third buffer and a multiplex process unit.

The processor unit has a function of executing an audio encoding process to convert the audio signal to encoded audio data, a function of executing a first control process for controlling a video encoding process and a function of executing a second control process for controlling a system process. The timing control unit generates at least one first timing signal for activating the video encoding process, a second timing signal for activating the audio encoding process and a third timing signal for activating the system process. The first buffer holds the encoded audio data temporarily. The video encoding process unit is activated in response to the first timing signal and executes the video encoding process to convert the video signal to encoded video data. The second buffer holds the encoded video data temporarily. The third buffer holds header data generated from the processor unit. The multiplex process unit executes the system process according to an indication from the processor unit and sequentially outputs the encoded video data, the encoded audio data and the header data supplied from first, second and third buffers, respectively, by an amount and in an order according to a system process parameter. The processor unit includes an interrupt control circuit receiving at least one of first, second and third timing signals to designate for an interrupt process one of the audio compression process, first and second control processes in response to generation of each timing signal supplied as an input. The processor unit preferentially executes the interrupt process.

Thus, a main advantage of the present invention lies in that mounting of the encoding device on a single LSI chip is allowed as the processor unit is shared for the video encoding process, the audio encoding process and the system process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail hereinbelow with reference to the drawings.

First Embodiment

Figure 1:
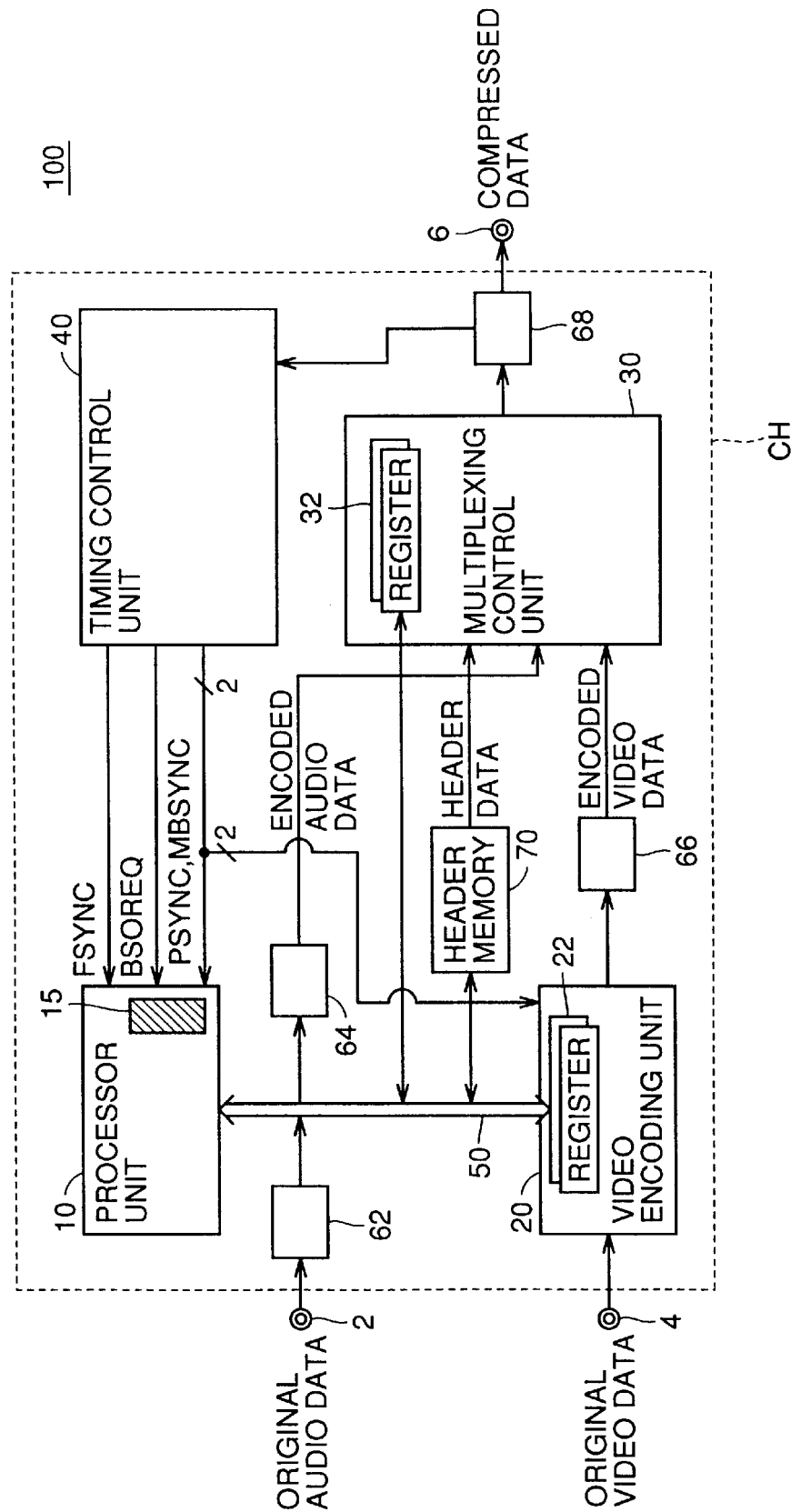
FIG. 1 is a block diagram showing an overall structure of an encoding device 100 according to the first embodiment of the present invention.

FIG. 1 shows an overall structure of an encoding device 100 according to the first embodiment of the present invention. As will become clear from the following description, the encoding device of the present invention is not intended only for the compression encoding process in compliance with MPEG2 standard and can be applied widely to encoding devices for multiplexing a video signal and an audio signal.

With reference to FIG. 1, encoding device 100, which can be mounted on one semiconductor substrate CH, includes an audio input terminal 2 receiving an input of original audio data, a video input terminal 4 receiving an input of original video data and a compressed data output terminal 6 supplying compressed data generated by multiplexing encoded video data and encoded audio data.

Encoding device 100 further includes an FIFO buffer 62 receiving original audio data, a processor unit 10 having a software for executing a compression encoding process on the original audio data (hereinafter also referred to simply as audio encoding process) and controlling an overall operation of encoding device 100, an FIFO buffer 64 receiving encoded audio data generated by compression encoding in processor unit 10, via an internal bus 50, a video encoding unit 20 executing a compression encoding process of original video data (hereinafter also referred to simply as video encoding process), an FIFO buffer 66 receiving encoded video data and a header memory 70 holding header data of a compressed data stream.

Encoding device 100 further includes a multiplexing control unit 30 receiving header data supplied from header memory 70, encoded video data supplied from FIFO buffer 66 and encoded audio data from FIFO buffer 64, and executing multiplexing process (hereinafter also referred to as system process) for supplying data of a type and amount according to a control parameter set in a register 32, an FIFO buffer 68 receiving data supplied from multiplexing control unit 30 and supplying the data to compressed data output terminal 6 at a constant rate and a timing control unit 40 generating a timing signal according to data amount in FIFO buffer 68, for activating the audio encoding process, the video encoding process and the system process.

Timing control unit 40 generates an audio timing signal FSYNC for activating the audio compression encoding process, picture timing signal PSYNC and macro block timing signal MBSYNC for activating the video compression encoding process and timing signal BSOREQ for requesting a transfer of a multiplex stream from multiplexing control unit 30 according to filled data amount of FIFO buffer 68.

With this structure, original video data is compressed and encoded in video encoding unit 20 and supplied to multiplexing control unit 30 via FIFO buffer 66. The original audio data is supplied to processor unit 10 via FIFO buffer 62 and internal bus 50. Processor unit 10 performs compression encoding of the original audio data and supplies encoded audio data to FIFO buffer 64. The encoded audio data is supplied to multiplexing control unit 30 from FIFO buffer 64. Processor unit 10 generates and supplies header data to header memory 70 via internal bus 50. Header memory 70 supplies header data to multiplexing control unit 30.

Multiplexing control unit 30 processes the encoded audio data from FIFO buffer 64, the encoded video data from FIFO buffer 66 and header data from header memory 70 according to the control parameters held in register 32 and selectively transfers one type of data to FIFO buffer 68.

Multiplexed compressed data stream thus supplied to FIFO buffer 68 is then supplied to compressed data output terminal 6 at a constant rate.

The video encoding process in video encoding unit 20 is executed in response to macro block timing signal MBSYNC and picture timing signal PSYNC generated from timing control unit 40 according to the cycles of macro block-related process and picture-related process, respectively. Thus, video encoding unit 20 executes the MB process for each MB in response to macro block timing signal MBSYNC and executes the picture-related process common to all MB included in the same frame in response to picture timing signal PSYNC.

Necessary control parameters for picture-related process and macro block-related process are set in a register 22 through processor unit 10. Hence, the operation of processor unit 10 must be in synchronization with timing signals PSYNC and MBSYNC.

The process at multiplexing control unit 30 is also controlled through processor unit 10 via internal bus 50 and register 32.

Each of a control process for controlling the audio encoding process and the video encoding process in video encoding unit 20 and a control process for controlling the system process in multiplexing control unit 30 is executed as an interrupt process through processor unit 10.

Processor unit 10 receives a timing signal generated from timing control unit 40 as an interrupt signal. Processor unit 10 includes an interrupt control circuit 15. Interrupt control circuit 15 determines, based on a plurality of interrupt signals supplied from timing control unit 40 and according to a predetermined priority, which interrupt process is to be executed. Processor unit 10 suspends a process which has been executed before the assertion of the interrupt process and preferentially executes the determined interrupt process.

As described above, encoding device 100 is characterized in that encoding device 100 employs a single processor unit 10 for the video encoding process, the audio encoding process and the system process and hence can be formed on single LSI chip CH.

Figure 2:
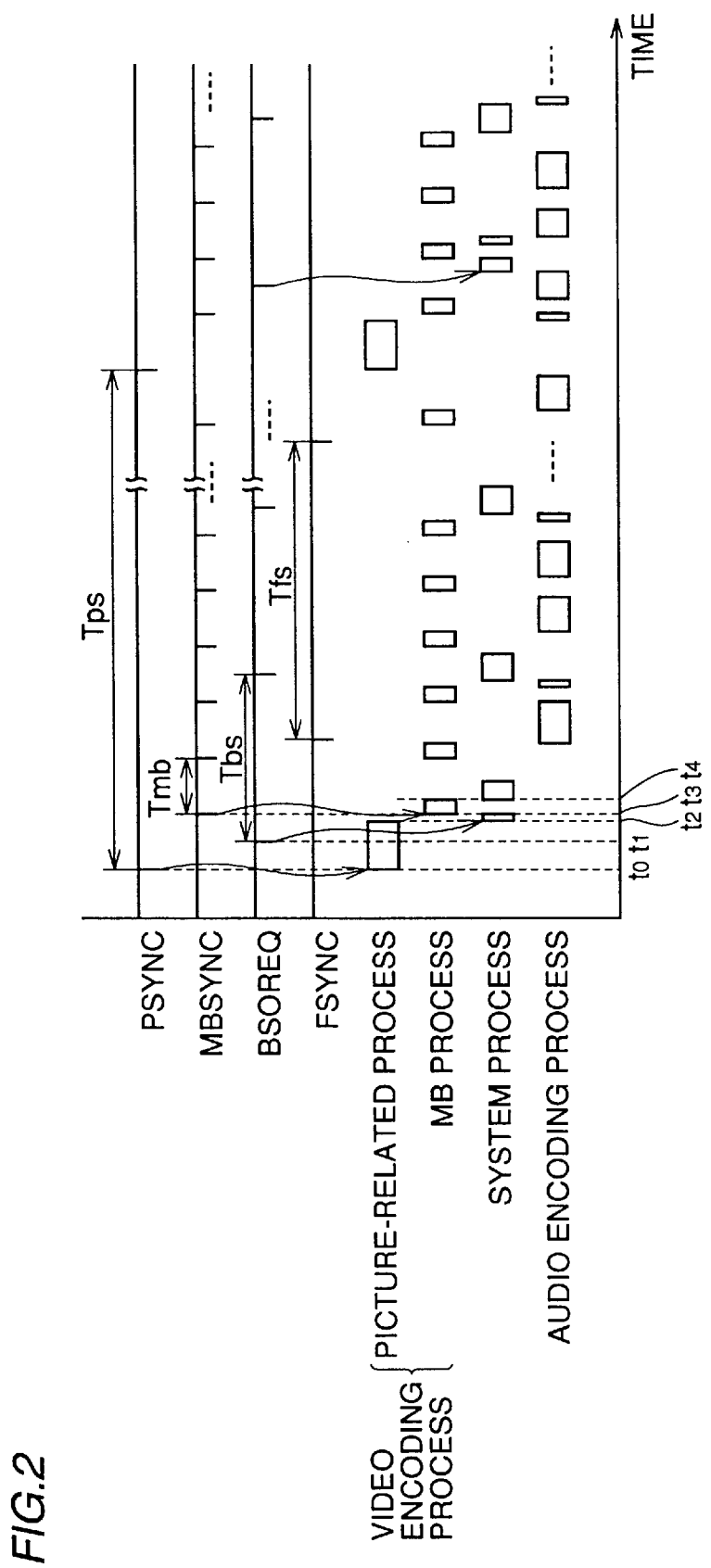
FIG. 2 is a timing chart referenced for describing an interrupt process in processor unit 10.

FIG. 2 is a timing chart referenced for describing an interrupt process in processor unit 10.

In encoding device 100, processes are preferentially performed in the order of the picture-related process, the macro block-related process, and a multiplex stream supplying process. Such priority may be determined in advance based on a necessary length of the cycles for these processes.

As an example here, in the case of the video signal, it is assumed that thirty frames are processed in a second, which one frame is constituted from 1350 macro blocks. In addition, for the audio compression process, a sampling frequency of 48 kHz of MPEG1 audio standard layer II is employed and the process unit is defined as 1152 samples. Further, according to the TS format of MPEG2 standard, the output rate of compressed data stream output from compressed data output terminal 6 is assumed to be 20 Mbps.

In this case, the generation cycle Tps of picture timing signal PSYNC for activating the picture-related process can be given by $Tps=1\ sec/30=33.3\ msec$, and the generation cycle Tmb of macro block timing signal MBSYNC for activating the macro block-related process can be given by the following expression:

$Tmb=Tps/1350\ 32\ 24.7\ \mu sec$.

In addition, the generation cycle Tfs of audio timing signal FSYNC for activating the audio process can be given by the following expression:

$Tfs=1152\ samples/48\ kHz=24\ msec$.

Further, the generation cycle Tbs of BSOREQ can be given by the following expression:

$Tbs=1/(20\ Mpbs/8\ bit/188\ byte) \neq 75\ \mu sec$.

The priority of the interrupt by each process may be determined based on the generation cycles of these timing signals and so on. In this embodiment of the present invention, the priority of timing signals is in the order of MBSYNC, PSYNC, BSOREQ and FSYNC.

In processor unit 10, the video process, the audio process and the system process are activated as an interrupt process caused by these timing signals. Interrupt control circuit 15 does not accept an interrupt during an execution of a certain interrupt process if the generated interrupt is of a lower priority but accepts the interrupt if the priority of the generated interrupt process is higher than the one under way.

With reference to FIG. 2, the video picture-related process is activated in response to picture timing signal PSYNC generated at a time t0.

Then at time t1, timing signal BSOREQ is generated. As the picture-related process is being operated, the system process is not executed immediately and starts from time t2 at which the picture-related is completed.

While the system process is being operated, a timing signal MBSYNC of a higher priority is generated at time t3. Accordingly, the system process is suspended and the MB process is preferentially executed. The system process is resumed at time t4 at which the MB process completes.

As can be seen from the foregoing, when a plurality of interrupt processes, which are generated at independent cycles from each other, are activated such that their execution overlap, interrupt control circuit 15 determines which interrupt process is to be executed according to a predetermined priority.

Figure 3A:
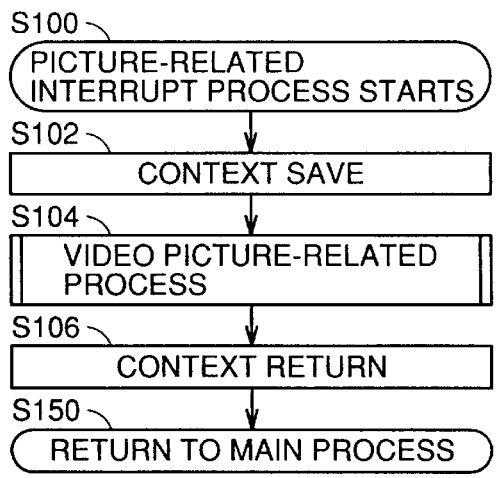
FIGS. 3A–3D are flow charts of programs of respective interrupt processes in processor unit 10.

FIG. 3A is a flow chart of a picture-related interrupt process in processor unit 10.

With reference to FIG. 3A, the interrupt process for the picture-related process is started with the generation of picture timing signal PSYNC (step S100). At the start of the interrupt process, a context save is executed to hold an internal state of processor unit 10 at the point (step S102). Then, a video picture-related process is executed, such as setting of the control parameters for register 22 in video encoding unit 20 (step S104). After the completion of the video picture-related process, a context return is executed to recover the internal state before the interrupt process (step S106). Thus, with the internal state before the interrupt process recovered, processor unit 10 returns to a main process and resumes the normal process (step S150).

Figure 3B:
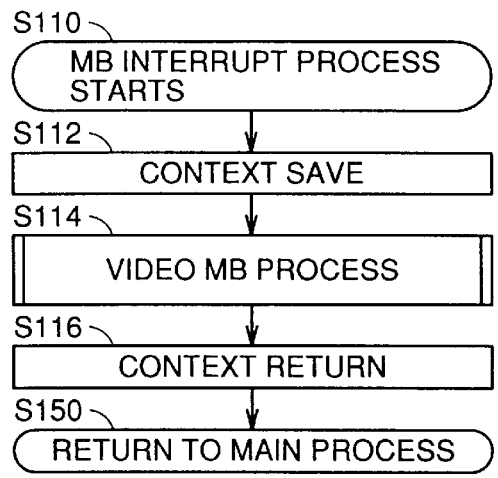

FIG. 3B shows an execution flow chart of a macro block-related interrupt process in processor unit 10.

With reference to FIG. 3B, the interrupt process for the MB process is started with the generation of macro block timing signal MBSYNC (step S110). At the start of the interrupt process, a context save is executed to hold an internal state of processor unit 10 at the point (step S112). Then, the video MB process is executed, such as setting of the control parameters for register 22 in video encoding unit 20 (step S114). After the completion of the video MB process, a context return is executed to recover the internal state before the interrupt process (step S116). Thus, with the internal state before the interrupt process recovered, processor unit 10 returns to a main process and resumes a normal process (step S150).

Figure 3C:
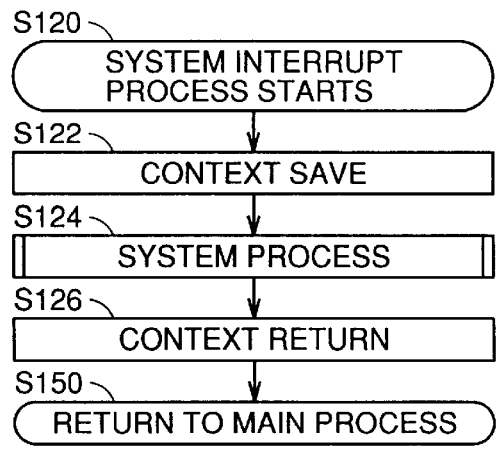

FIG. 3C is an execution flow chart of a system interrupt process in processor unit 10.

With reference to FIG. 3C, the interrupt process for the system process is started with the generation of timing signal BSOREQ (step S120). At the start of the interrupt process, a context save is executed to hold an internal state of processor unit 10 at the point (step S122). Then, the system process is executed, such as setting of the control parameters for register 32 in multiplexing control unit 30 (step S124). After the completion of the system process, a context return is executed to recover the internal state before the interrupt process (step S126). Thus, with the internal state before the interrupt process recovered, processor unit 10 returns to a main process and resumes a normal process (step S150).

Figure 3D:
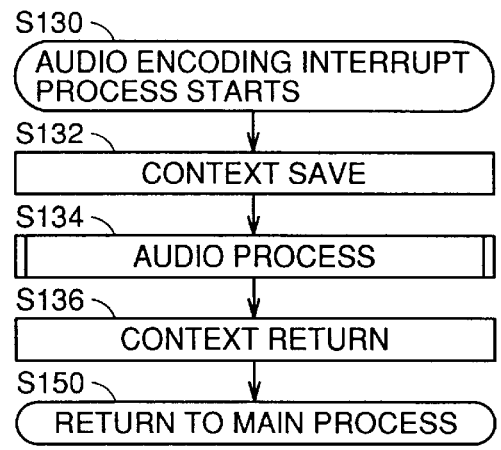

FIG. 3D is an execution flow chart of an audio encoding interrupt process in processor unit 10.

With reference to FIG. 3D, the interrupt process for the audio encoding process is started with the generation of timing signal FSYNC (step S130). At the start of the interrupt process, a context save is executed to hold an internal state of processor unit 10 at the point (step S132). Then, a software for performing the audio encoding process is activated and the audio process is executed (step S134). After the completion of the audio process, a context return is executed to recover the internal state before the interrupt process (step S136). Thus, with the internal state before the interrupt process recovered, processor unit 10 returns to a main process and resumes a normal process (step S150).

As can be seen from above, each interrupt process program is written such that an internal state of processor unit 10 is temporarily held through the context save at the execution of each interrupt process and the internal state is recovered after the completion of the interrupt process to return to the main process. The video process, the audio process and the system process, thus can sequentially be activated as an interrupt process according to the priority.

Thus, as the video process, the audio process and the system process are activated as interrupt processes in processor unit 10 in encoding device 100 according to the first embodiment, a single processor unit can be shared for the video process, the audio process and the system process. Thus unnecessary cost can be reduced.

Second Embodiment

Because the first embodiment has a structure in which each of the video process, the audio process and the system process is activated as an interrupt process in response to the timing signal, interrupt control circuit 15 must be provided in processor unit 10, which leads to a problem of increase in the hardware. In addition, because all processes are executed as the interrupt process, during an execution of one interrupt process, another interrupt process which should be performed preferentially may be requested.

In encoding device 100, for example, the audio encoding can be interrupted by the system process, which can further be interrupted by the macro block-related process. When a plurality of interrupt processes are concurrently requested in multi-level form, of which interrupt processes a priority hierarchically is determined, the process being executed when the interrupt is requested must be suspended and the internal state of the processor unit must be held through the context save each time the interrupt is requested. Hence, a program for these operations is necessary which further leads to the increase in the number of process cycles.

To solve the above described problems, reduction of the number of interrupt levels is effective.

The second embodiment is characterized in that the audio process is not activated as an interrupt process by the timing signal but is performed as a part of the main process in processor unit 10.

Figure 4:
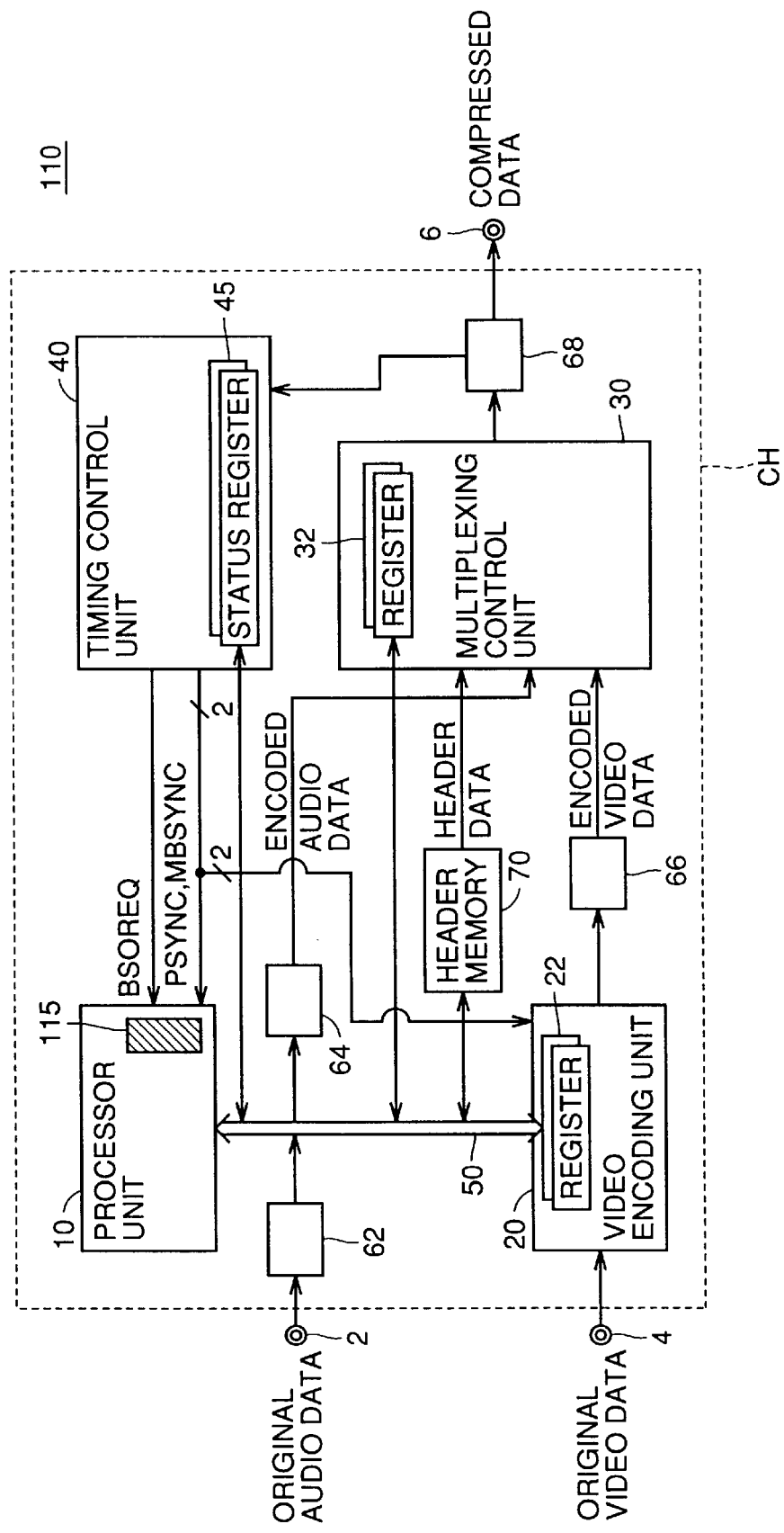
FIG. 4 is an overall block diagram showing a structure of an encoding device 110 according to the second embodiment of the present invention.

With reference to FIG. 4, an encoding device 110 according to the second embodiment of the present invention is different from encoding device 100 according to the first embodiment in that encoding device 110 includes a status register 45 in timing control unit 40, for indicating the state of audio timing signal FSYNC and that processor unit 10 does not execute the interrupt process activated by audio timing signal FSYNC.

Because status register 45 is connected to internal bus 50, processor unit 10 can read a value in status register 45 via internal bus 50. By monitoring the state of status register 45, processor unit 10 can execute the audio encoding process in the main program process at a timing requested from timing control unit 40.

Figure 5:
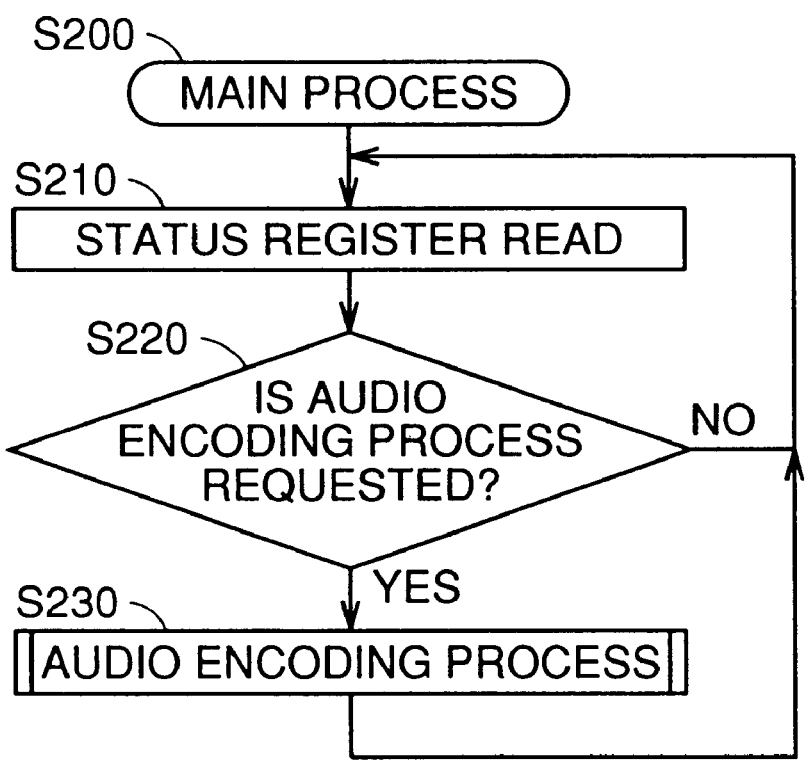
FIG. 5 is a flow chart of a main process program in a processor unit 10 in an encoding device 110.

FIG. 5 is a flow chart of a main process program of processor unit 10 in encoding device 110.

With reference to FIG. 5, while the main process is executed (step S200), data reading from status register 45 is executed (step S210) to check whether a value of status register 45 is in a state indicating the execution of the audio encoding process (step S220).

When the audio encoding is requested, an audio encoding process is activated (step S230). On the other hand, if the state of status register 45 does not indicate the request for the activation of the audio encoding process, reading of status register 45 is executed again (step S210).

In the following description, a technique is used for determining whether the process is to be activated or not through monitoring the state of the status register as in encoding device 110, which technique is called "polling".

The video process and the system process are executed as an interrupt to the main program, which interrupt is responsive to the generation of timing signals PSYNC, MBSYNC and BSOREQ.

With this structure, the number of interrupt levels can be reduced from three to two and the amount of hardware structure of interrupt control circuit 115 can be decreased. Further, with the reduction of the number of context process activation, process time can be reduced.

In the second embodiment, the audio encoding process is activated through polling. Based on the condition of the encoding and so on, the system process instead of audio encoding can be activated through the polling.

Third Embodiment

In the third embodiment, a structure will be described in which the number of interrupt levels is further reduced to only one.

Figure 6:
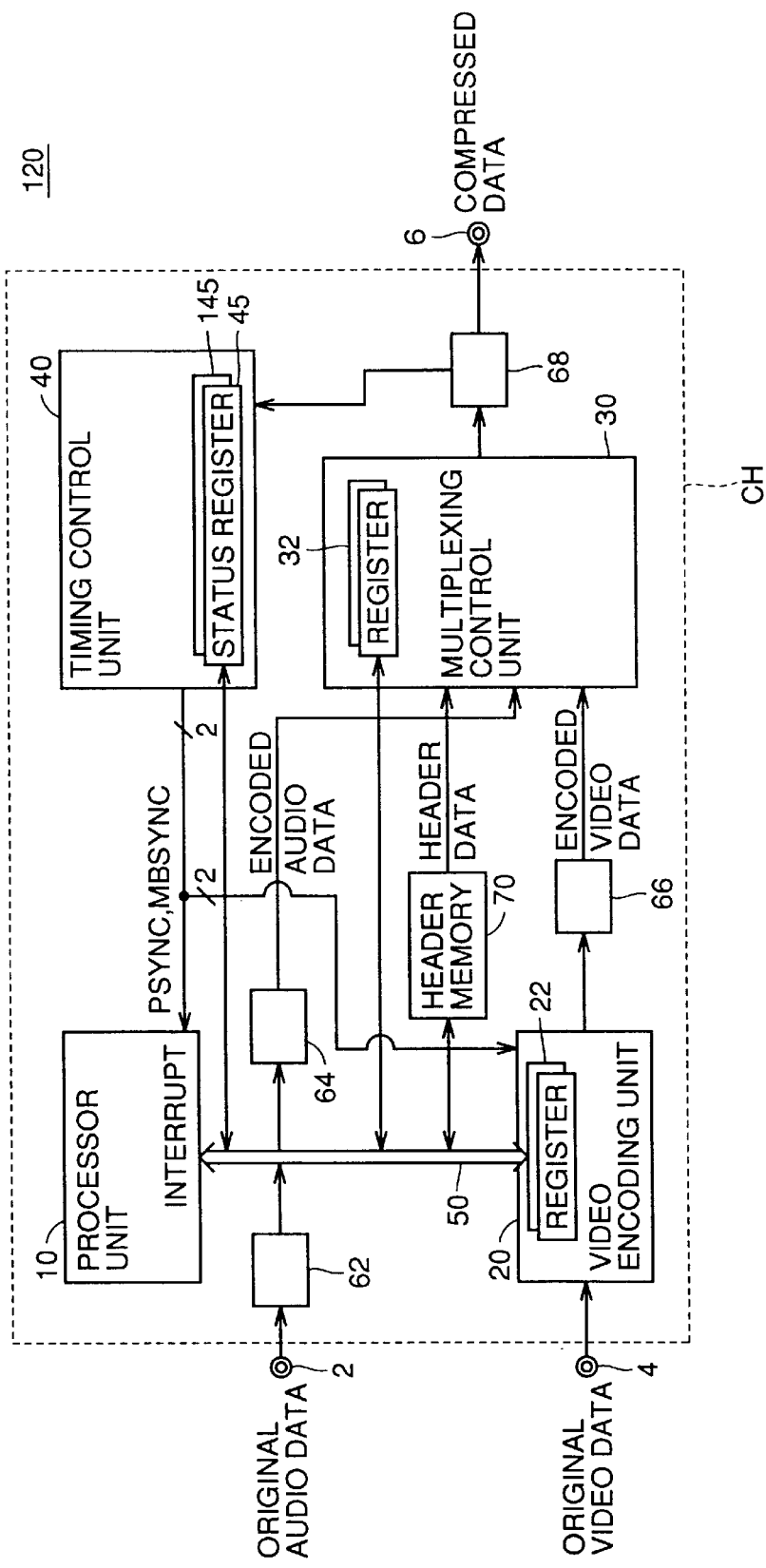
FIG. 6 is an overall block diagram showing a structure of an encoding device 120 according to the third embodiment of the present invention.

With reference to FIG. 6, an encoding device 120 according to the third embodiment of the present invention is different from encoding device 110 according to the second embodiment in that timing control unit 40 further includes a status register 145 in addition to status register 45 and that timing signal BSOREQ is not supplied to processor unit 10 from the timing control unit, which timing signal is used for interrupt request relating to the system process.

Status register 145 indicates a state of timing signal BSOREQ, for executing the activation of the system process also through polling. The content of status register 145 can be read through processor unit 10 via internal bus 50. As described in the section relating to the second embodiment, status register 45 indicates the state of audio timing signal FSYNC.

In encoding device 120, though the polling relating to the audio encoding process is executed in the main process of processor unit 10 as described with reference to FIG. 5, a polling relating to the system process must be executed in the interrupt process program relating to the video encoding process.

Figure 7A:
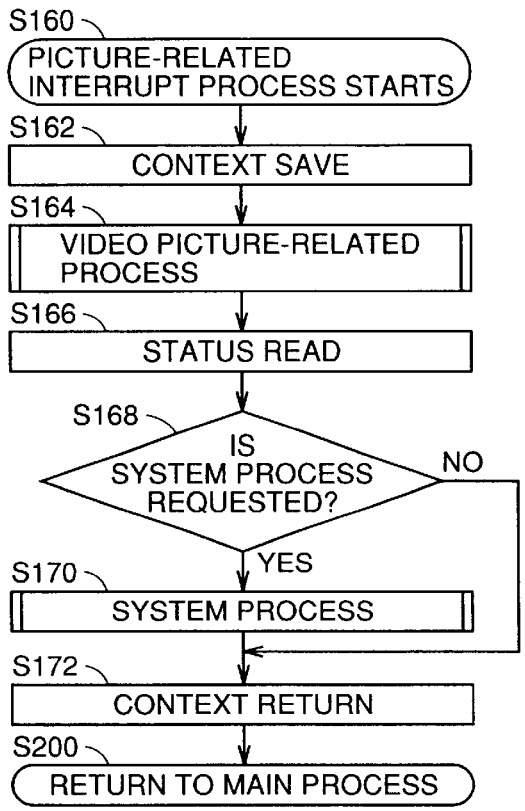
FIGS. 7A and 7B are flow charts of a video encoding process in an encoding device 120.

FIG. 7A is an execution flow chart of a picture-related interrupt process in encoding device 120.

With reference to FIG. 7A, when the interrupt process for the picture-related process is started with the generation of picture timing signal PSYNC (step S160), a context save is executed to hold an internal state of the processor unit at the point (step S162) followed by the video picture-related process (step S164).

After the completion of the video picture-related process, status read of status register 145 is executed (step S166) and a signal level of timing signal BSOREQ is checked to confirm whether the system process is requested or not (step S168). If timing signal BSOREQ has been generated to request the system process, the system process is executed (step S170). After the completion of the system process, a context return is executed to recover the internal state of the processor unit before the interrupt process (step S172).

If timing signal BSOREQ has not been generated and the execution of the system process is not requested, a context return is executed without the execution of the system process (step S172). Then, the internal state of the processor unit before the video picture-related is recovered through the context return and, the process returns to the main process and the processor 10 resumes the main process (step S200).

Figure 7B:
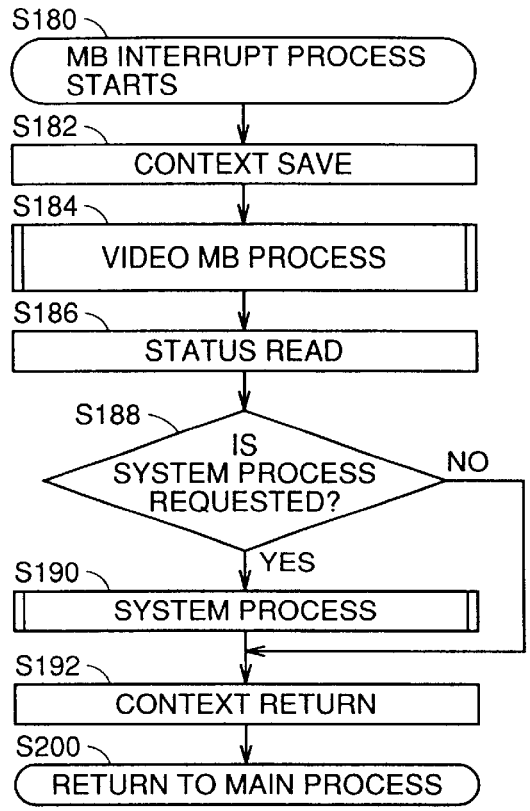

FIG. 7B is an execution flow chart of a macro block-related interrupt process in encoding device 120.

With reference to FIG. 7B, when the interrupt process for the video MB process is started with the generation of macro block timing signal MBSYNC (step S180), a context save is executed to hold an internal state of the processor unit at the point (step S182) followed by the video MB process (step S184).

After the completion of the video MB process, status read of status register 145 is executed (step S186) and a signal level of timing signal BSOREQ is checked to confirm whether the system process is requested or not (step S188). If timing signal BSOREQ has been generated to request the system process, the system process is executed (step S190). After the completion of the system process, a context return is executed to recover the internal state of the processor unit before the interrupt process (step S192).

If timing signal BSOREQ has not been generated and the execution of the system process is not requested, a context return is executed without the execution of the system process (step S192). Then, the internal state of the processor unit before the video MB process is recovered through the context return and, the process returns to the main process and the processor 10 resumes the main process (step S200).

With both audio encoding process and the system process being activated through the polling, the interrupt to processor unit 10 becomes only one level interrupt, and it becomes unnecessary to provide a hardware structure corresponding to interrupt control circuits 15 and 115 determining the priority of the interrupt processes. In addition, because the interrupt is of only one level, it becomes relatively easy to reproduce a defective state when the defect is found in encoding device 120. Then, it becomes easier to debug and the development time can be reduced.

In the second embodiment, the polling relating to the audio encoding process is executed in the main process of processor unit 10 and, in the third embodiment, the polling relating to the system process is executed in the interrupt process of processor unit 10. Yet, it is possible to execute polling relating to the system process and the audio encoding respectively during the main process and the interrupt process.

Fourth Embodiment

In first to third embodiments, it is assumed that the video encoding process, the audio encoding process and the system process are completed in a cycle of respective timing signals.

In practice, however, these processes do not always complete during a corresponding cycle because of some malfunction. In such case, the operation of the encoding device as a whole becomes defective and stable operation becomes impossible.

In the fourth embodiment, a structure will be described in which each process securely ends during a designated corresponding cycle and the failure of the operation of the encoding device as a whole can be prevented.

In the following description, a checking function for the audio encoding process will be described as an example. The same procedure can be applied to the video encoding process and the system process as well.

Figure 8:
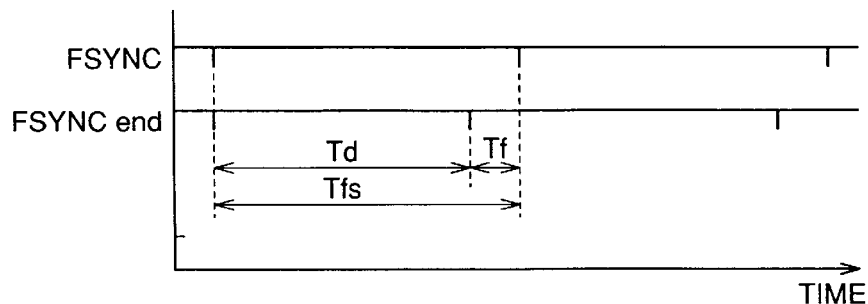
FIG. 8 is a timing chart of a timing signal relating to an audio encoding process.

With reference to FIG. 8, in the fourth embodiment, a check signal FSYNCend additionally is provided for checking the secure ending in an audio cycle Tfs of the audio process corresponding to audio timing signal FSYNC generated to have audio cycle Tfs.

Check signal FSYNCend is generated a time period Tf prior to the end of audio cycle Tfs. In other words, the check signal is generated at a timing Td=Tfs−Tf after the generation of audio timing signal FSYNC. Time period Tf may be set corresponding to a time period required for the forced termination of the audio process.

Secure operation of the encoding devices is intended by providing a structure, in which check signal FSYNCend is reflected to the status register in timing control unit 40 and checked in the main program.

Figure 9:
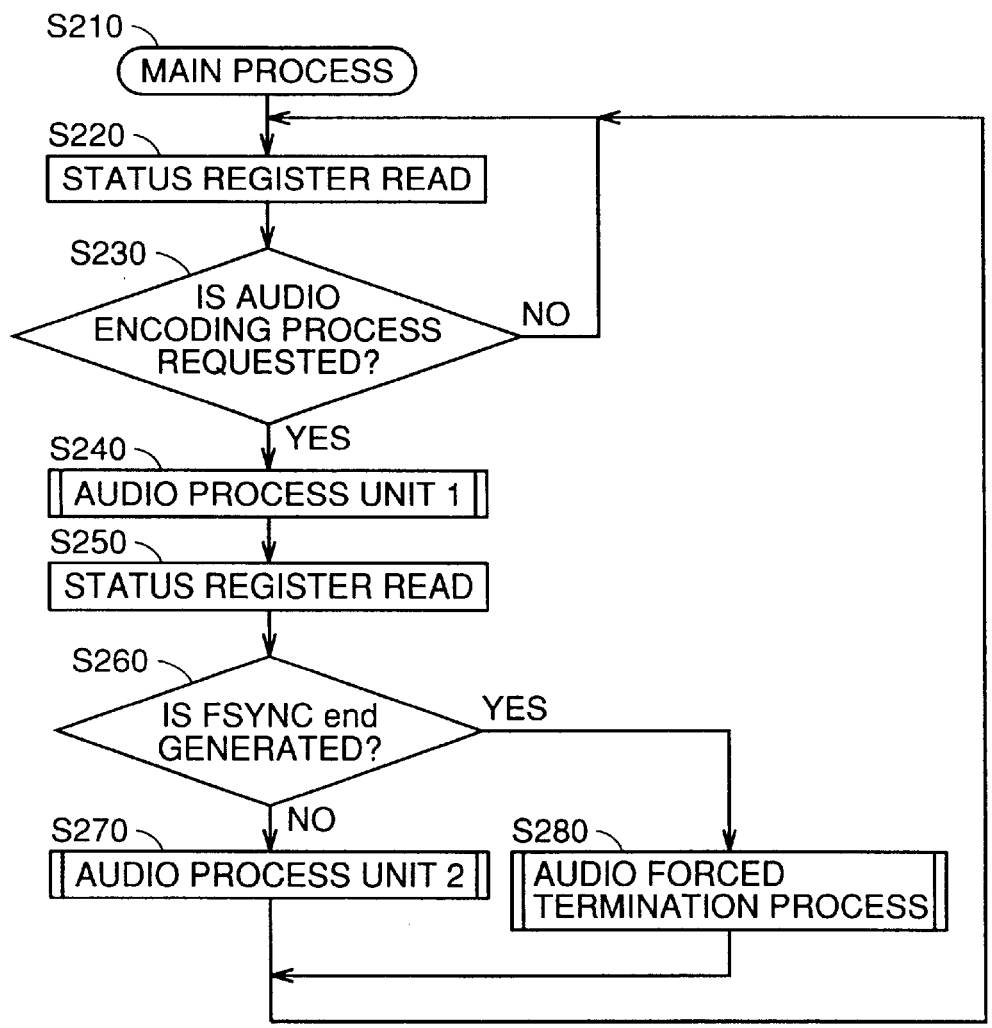
FIG. 9 is a flow chart of a main program in a processor unit 10 according to the fourth embodiment of the present invention.

FIG. 9 is a flow chart of a main program of processor unit 10 according to the fourth embodiment.

With reference to FIG. 9, while the main process is executed (step S210), the reading of the status register is performed (step S220), and whether the audio encoding process is requested or not is checked based on a state of audio timing signal FSYC (step S230).

In the fourth embodiment, the audio process is divided into a plurality of process units. In a case described in FIG. 9, an audio encoding process in one cycle is divided into two process units, that is, an audio process unit 1 and an audio process unit 2.

In response to the activation of audio timing signal FSYNC, first divided unit, that is, audio process unit 1 is executed (step S240). After the completion of audio process unit 1, reading of the status register is executed again (step S250), to check the state of check signal FSYNCend (step S260).

If check signal FSYNCend is generated at this timing, the audio process is forced to terminate without the execution of remaining audio process 2 to prevent the failure of the operation of the encoding device as a whole (step S280).

On the other hand, if check signal FSYNCend is not generated, the remaining audio process 2 is executed.

Though the audio process is divided into two process units as an example in FIG. 9, the audio process can be divided into any number of process units. In addition, a similar check signal can be provided for timing signals other than the audio timing signal.

With the above described structure, the video encoding process, the audio encoding process and the system process can securely end in a predetermined cycle, thus the failure of the encoding device as a whole can be prevented.

Fifth Embodiment

In first to fourth embodiments, the video encoding process, the audio encoding process and the system process are activated in response to the generation of corresponding timing signals, respectively.

In some cases however, the internal state of the video encoding unit after the activation needs to be checked in processor unit 10, in a case, for example, where setting of a quantization parameter which is one of the control parameters for the video encoding process is desired to be performed based on an average data value of the macro block-related process results.

In such case, the encoding parameter to be set in the register cannot be settled until a certain time period has elapsed after the activation of the video encoding process. To solve this problem, a structure must be formed such that an interrupt process can be started through processor unit 10 after the elapse of a predetermined time period from the activation of each process using delay signals of respective timing signals.

Figure 10:
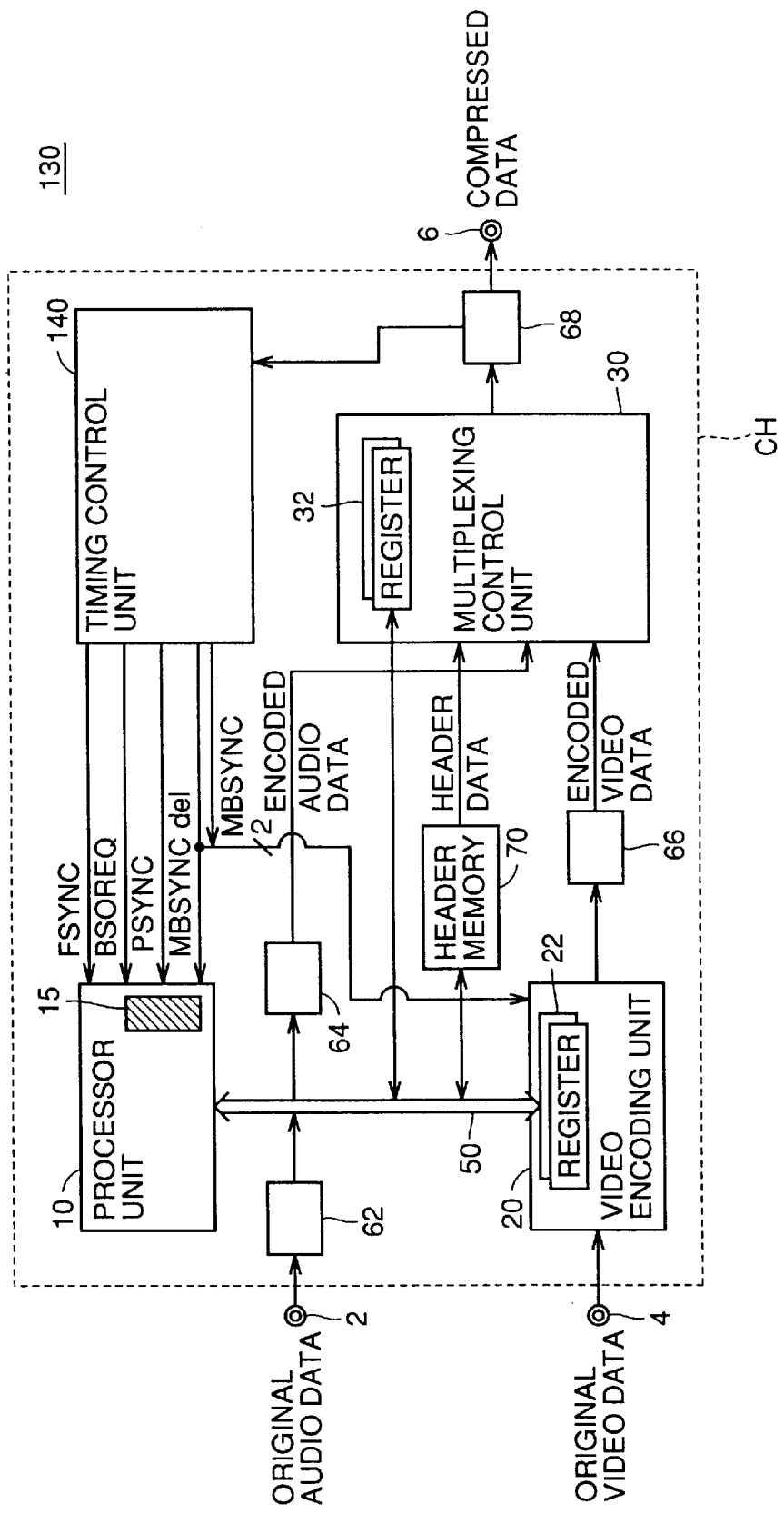
FIG. 10 is a block diagram showing a structure of an encoding device 130 according to the fifth embodiment of the present invention.

FIG. 10 is a block diagram showing a structure of an encoding device 130 according to the fifth embodiment of the present invention.

With reference to FIG. 10, a case is described in which a signal MBSYNCdel is generated from a timing control unit 140 as a delay signal corresponding to macro block timing signal MBSYNC.

Timing control unit 140 relating to the macro block-related process generates macro block timing signal MBSYNC and a delay signal thereof MBSYNCdel. Timing control unit 140 sends timing signal MBSYNC to video encoding unit 22 and supplies delay signal MBSYNCdel of timing signal MBSYNC to processor unit 10. Thus, processor unit 10 activates an interrupt operation relating to the video encoding process after the elapse of a predetermined time period from the activation of the macro block-related process to set an encoding parameter such as a quantization parameter in register 22.

Figure 11:
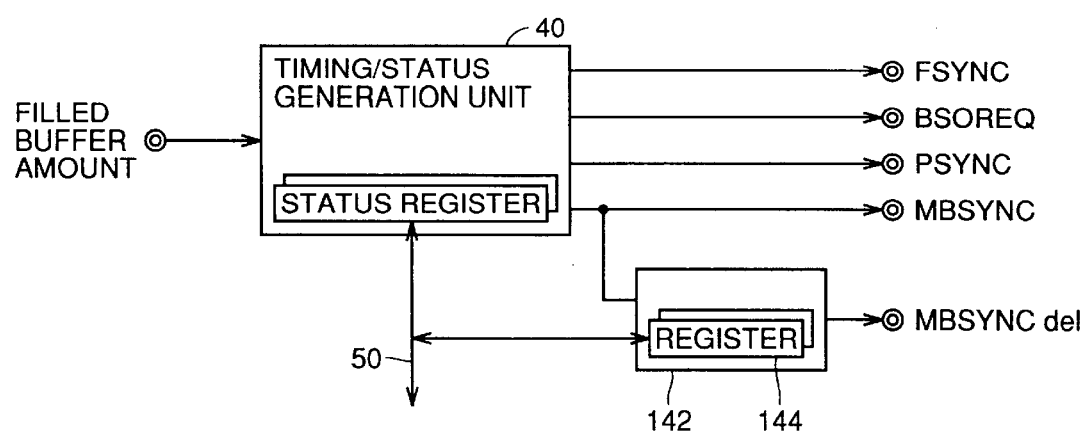
FIG. 11 is a block diagram showing a structure of a timing control unit 140.
Figure 12:
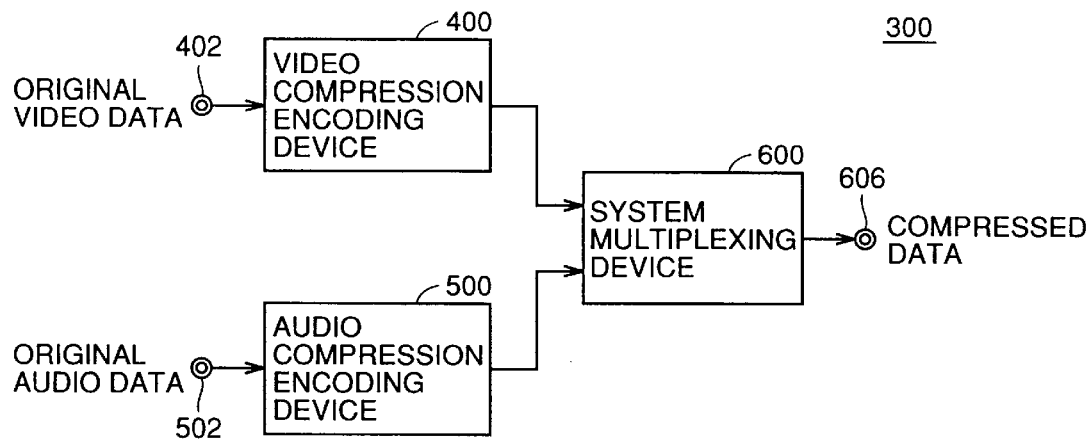
FIG. 12 is a schematic block diagram showing an overall structure of a multiplexing encoding system 300 according to a conventional art.
Figure 13:
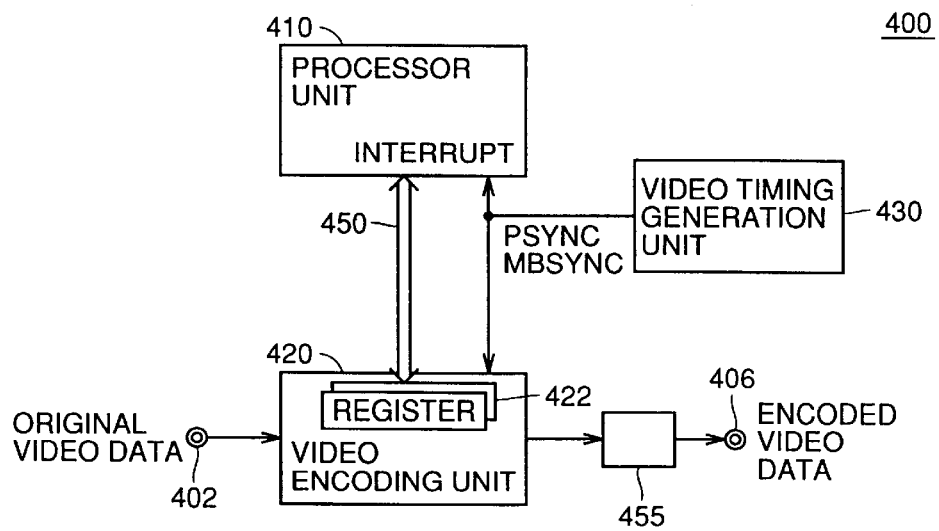
FIG. 13 is a block diagram showing a structure of a video compression encoding device 400.
Figure 14:
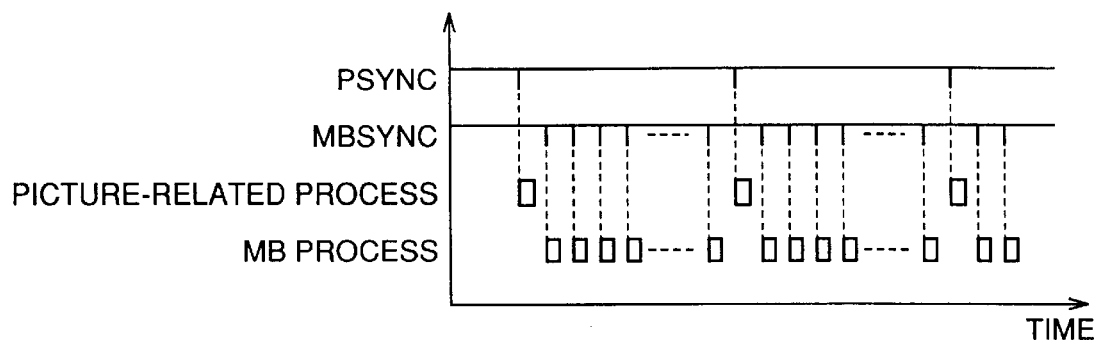
FIG. 14 is a timing chart referenced for describing an execution timing of a video encoding process.
Figure 15:
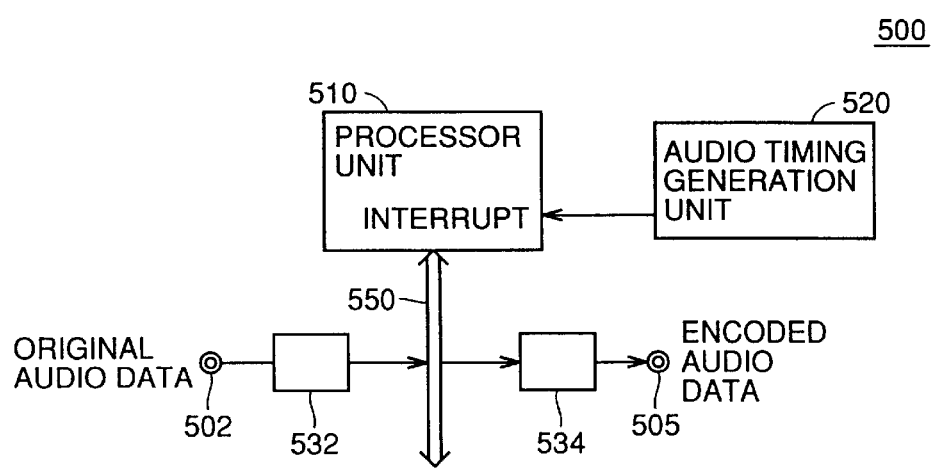
FIG. 15 is a block diagram showing a structure of an audio compression encoding device 500.
Figure 16:
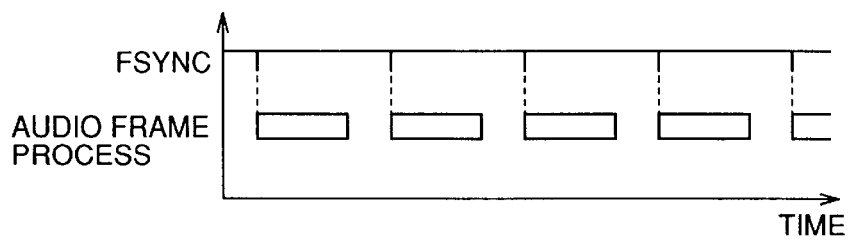
FIG. 16 is a timing chart referenced for describing an execution timing of an audio encoding process.
Figure 17:
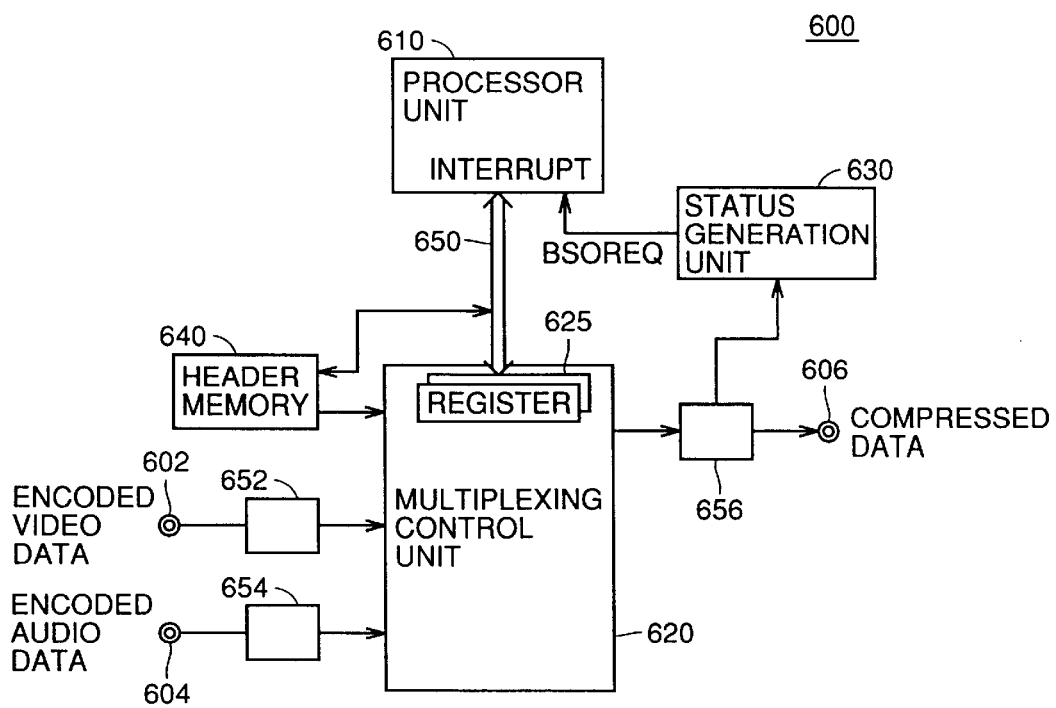
FIG. 17 is a block diagram showing a structure of a system multiplexing device 600.

With reference to FIG. 11, timing control unit 140 further includes a delay circuit 142 generating a delay signal, in addition to the structure of timing control unit 40. Delay circuit 142 generates a delay timing signal MBSYNCdel which is a delay signal of timing signal MBSYNC by a delay time set in a register 144.

With register 144 being connected to internal bus 50, processor unit 10 can set a delay time to be set in register 144 via internal bus 50 to any value.

When a similar structure is applied to other timing signal, a delay timing signal with any delay time can be generated corresponding to each timing signal indicating an activation timing of one of the video process, the audio process and the system process. Thus the interrupt process can be executed at any timing through processor unit 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An encoding device multiplexing an input video signal and an input audio signal according to a predetermined compression encoding standard, comprising:

a processor unit having a function of executing an audio encoding process to convert said audio signal to encoded audio data, a function of executing a first control process for controlling a video encoding process and a function of executing a second control process for controlling a system process;

a timing control unit to generate at least one first timing signal for activating said video encoding process, a second timing signal for activating said audio encoding process and a third timing signal for activating said system process;

a first buffer to hold said encoded audio data temporarily;

a video encoding process unit, activated in response to said first timing signal, to execute said video encoding process for converting said video signal to encoded video data;

a second buffer to hold said encoded video data temporarily;

a third buffer to hold header data generated from said processor unit; and a multiplex process unit to execute said system process according to an indication from said processor unit to sequentially output said encoded video data, said encoded audio data and said header data supplied from said first, second and third buffers, respectively, by an amount and in an order according to a system process parameter; wherein said processor unit includes an interrupt control circuit receiving at least one of said first, second and third timing signals to designate for an interrupt process one of said audio compression process, said first and second control processes in response to generation of each timing signal supplied as an input, and said processor unit preferentially executes said interrupt process.

2. The encoding device according to claim 1 wherein said interrupt control circuit can change the designation of said interrupt process based on a predetermined priority when another of said timing signals is generated during an execution of said interrupt process.

3. The encoding device according to claim 2 wherein said interrupt control circuit receives said first, second and third timing signals.

4. The encoding device according to claim 2 further comprising;

an internal bus connected to said processor unit to execute data transmission in said encoding device, wherein said timing control unit includes a status register connected to said internal bus to indicate a state of said second timing signal;

said processor unit activates said audio encoding process according to a state of said status register; and said interrupt control circuit designates one of said first and second control processes as said interrupt process in response to generation of said first and third timing signals, respectively.

5. The encoding device according to claim 2 further comprising;

an internal bus connected to said processor unit to execute data transmission in said encoding device wherein said timing control unit includes a status register connected to said internal bus to indicate a state of said third timing signal, said processor unit activates said second control process according to a state of said status register, and said interrupt control circuit designates one of said first control process and said audio encoding process as said interrupt process in response to generation of said first and second timing signals, respectively.

6. The encoding device according to claim 2 further comprising;
an internal bus connected to said processor unit to execute data transmission in said encoding device, wherein
said timing control unit includes,
a first status register indicating a state of said second timing signal, and
a second status register indicating a state of said third timing signal,
said first and second status registers being connected to said internal bus
said processor unit activates said audio encoding process according to a state of said first status register,
said processor unit executes said second control process as said interrupt process in response to generation of said first timing signal and
said processor unit activates said second control process according to a state of said second status register at a time of completion of said interrupt process.

7. The encoding device according to claim 2 further comprising;
an internal bus connected to said processor unit to execute data transmission in said encoding device, wherein
said timing control unit includes
a first status register indicating a state of said second timing signal, and
a second status register indicating a state of said third timing signal,
said first and second status registers being connected to said internal bus
said processor unit activates an operation of said second control process according to a state of said second status register,
said processor unit executes said first control process as said interrupt process in response to a generation of said first timing signal,
said processor unit activates said audio encoding process according to a state of said first status register at a time of completion of said interrupt process.

8. The encoding device according to claim 1 further comprising;
an internal bus connected to said processor unit to execute data transmission in said encoding device, wherein
said video encoding process unit includes a first control register holding a control parameter for said video encoding process,
said multiplexing control unit includes a second control register holding said system process parameter,
said first and second control registers are connected to said internal bus and
said processor unit updates a content held in said first control register via said internal bus at a time of said first control process and updates a content held in said second control register via said internal bus at a time of said second control process.

9. The encoding device according to claim 1 wherein
said timing control unit activates each of said first, second and third timing signals periodically,
said timing control unit generates at least one forced termination activation signal according to at least one of said first, second ant third timing signal, and
said processor unit indicates, at a timing of activation of said at least one forced termination activation signal, forced termination of an operation of a corresponding process if said operation has not been completed.

10. The encoding device according to claim 9 wherein
each of said at least one of forced termination activation signals is activated at a timing a predetermined time period earlier than a next activation timing of a corresponding timing signal, and
said predetermined time period corresponds to a time period for executing a necessary process for said forced termination.

11. The encoding device according to claim 1 further comprising;
an internal bus connected to said processor unit to execute data transmission in said encoding device, wherein
said timing control unit includes at least one signal delay circuit provided each corresponding to at least one of said first, second and third timing signals,
each of said signal delay circuit delays said corresponding timing signal by a delay time and outputs a resulting signal,
each of said signal delay circuit has a register connected to said internal bus to hold said delay time,
said processor unit receives an output signal from said corresponding signal delay circuit instead of said at least one of said first, second and third timing signals.

12. The encoding device according to claim 1 wherein
said processor unit holds an internal state of said processor before execution of said interrupt process and recovers said held internal state at a time of completion of said interrupt process.

13. The encoding device according to claim 1 wherein
said predetermined compression encoding standard is MPEG2 standard.

14. The encoding device according to claim 1 wherein
said processor unit, said timing control unit, said first to third buffers and said multiplexing control unit are formed on a same semiconductor substrate.

15. The encoding device according to claim 1 wherein
the encoding device further comprises
an output buffer to hold an output from said multiplex process unit to output the held output at a predetermined rate, and
said processor unit, said timing control unit, said first to third buffers, said output buffer and said multiplexing control unit are formed on a same semiconductor substrate.

* * * * *